Oct. 15, 1968 J. G. FALCIONI 3,405,594

RIVET JOINING METHOD, PIN THEREFOR AND PIN MANUFACTURING METHOD

Filed Dec. 11, 1964 2 Sheets-Sheet 1

INVENTOR.
JOSEPH G. FALCIONI

BY
Robert W. Beach

ATTORNEY

Oct. 15, 1968 J. G. FALCIONI 3,405,594

RIVET JOINING METHOD, PIN THEREFOR AND PIN MANUFACTURING METHOD

Filed Dec. 11, 1964 2 Sheets-Sheet 2

INVENTOR.
JOSEPH G. FALCIONI

BY
Robert W. Beach

ATTORNEY

United States Patent Office 3,405,594
Patented Oct. 15, 1968

3,405,594
RIVET JOINING METHOD, PIN THEREFOR AND PIN MANUFACTURING METHOD

Joseph G. Falcioni, Tacoma, Wash., assignor to The Boeing Company, Seattle, Wash., a corporation of Delaware Filed Dec. 11, 1964, Ser. No. 417,661
20 Claims. (Cl. 85—37)

ABSTRACT OF THE DISCLOSURE

The shank of a rivet to be driven cold is reduced in size or hardened over the portion of its length adjacent to its end to be upset within and slightly outward from the end of the rivet-receiving hole. Mushrooming of the rivet into engagement with the hole end is thus deterred and delayed to enable the portion of the rivet shank within the central portion of the hole to be shortened under impact and swell to press substantially uniformly against the hole wall throughout its length.

In the fabrication of large structures from sheet or plate material it is necessary to join the edge portions of adjacent plates or sheets. Customarily two types of joints have been used, namely, riveted joints and welded joints. Riveted joints have usually been considered to be more reliable than welded joints because it is difficult to insure the uniform high quality of all portions of a welded joint; whereas it has been felt that a riveted joint was simply mechanical and entirely reproducible. In most riveted joints the rivets are subjected to shear stress and consequently the joint was primarily designed by providing a sufficient number of rivets of large enough cross section to withstand the shear stresses which it was expected would be imposed on the joint.

In actual practice it has been found that riveted joints frequently fail by fracture of the workpieces joined by the rivets rather than by shearing of the rivets themselves. Such joint failure has occurred particularly in instances where the joint has been subjected to flexure resulting in it being subjected to conditions of stress reversal, such as in an airplane wing structure, for example. In an airplane wing, particularly in the case of a joint extending spanwise of the wing, the load on the joint will fluctuate depending upon whether the wing is subjected to the load of supporting the airplane, as in flight, or simply the load of supporting the wing when the airplane is on the ground. Also, the stress to which the joint is subjected will fluctuate depending upon whether the airplane in flight is climbing or descending, and to what extent the wing may be flexed by encountering updrafts or downdrafts.

After an airplane wing, for example, has been subjected to such variations in stress and reversal of stress the joint may fail as a result of fatigue of the metal. In such instances it has been found that the failure of the metal occurs in the workpiece joined by the rivets, rather than the rivets themselves failing, and the failure always occurs at a rivet hole. Load tests show that a hole creates stress-concentration points. Consequently it is not clear that fatigue failures in the workpieces of a joint can be overcome by reducing the size of the holes receiving the rivets and increasing the number of rivets, nor can solution of the problem be assured by varying the arrangement of the rivets.

Testing riveted joints to produce fatigue and subsequent examination of the test pieces has disclosed that the fracture of the workpieces in a riveted joint begins in the portion of the joint generally centrally between the outer faces of the joint. Further tests have indicated that customarily the rivet shank is expanded somewhat less in the central portion of the joint than adjacent to the exposed faces of the workpieces joined, and the expansion of such central portion of the rivet shank is not uniform. Such expansion has been found to vary somewhat in accordance with the procedure followed in clinching the rivet. Also, careful measurements appear to provide a correlation between the location at which the fracture of the workpiece began and the expansion of the rivet which occurred during its installation.

In general, it has been found that fatigue failure is postponed where a pin or rivet shank has been expanded to fill the receiving hole tightly and the expansion has been more uniform throughout the length of such shank. Presumably such expansion or upsetting of the pin or rivet shank produces a stress in the circumference of the receiving hole which reduces the severity of stress reversal, or stress variation, and correspondingly reduces the effect of fatigue.

It is a principal object of the present invention, therefore, to provide a riveted joint construction in which the expansion of the pin or rivet shank transversely of the length of the pin or rivet will be substantially uniform lengthwise of the shank over the length of the receiving hole, or at least in which such expansion of the pin or rivet shank will be more uniform than it is in conventional riveting practice.

More specifically it is an object to effect an increase in the expansion of the central portion of the pin or rivet shank in producing a riveted joint by detering seizure between a portion, or portions, of the shank adjacent to an end of the receiving hole and the corresponding portion of the workpiece so that such portion of the pin or rivet shank can move toward the central portion of the receiving hole as such central portion is upset by the pin or rivet clinching operation.

A companion object is to provide a pin or rivet of special construction, or having special characteristics, to deter such seizure. An incidental object is to provide a pin or a rivet of such special character which is effective in operation and economical to produce.

The foregoing objects can be accomplished by utilizing a pin, or rivet, which is treated, or formed, specially in a zone, or zones, to be disposed adjacent to the end of a hole in workpieces to be joined adapted to receive such a pin or rivet. Such special treatment is effected to deter such contact between the portion or zone of the pin shank at an end of the pin-receiving hole and the workpiece at the hole end as to restrain movement of such portion of the pin shank relative to the hole lengthwise inwardly. Such relief can be accomplished by hardening the metal of the pin shank in such zone, such as by cold-working it, heat-treating it, or plating it, or such shank zone can have a circumferential groove around it, or such zone can be treated by initially grooving it circumferentially and then upsetting the zone to expand it toward a cross section of a size equal to the cross section of a central portion of the rivet or pin shank. Such a specially treated pin or rivet can then be inserted in the hole of a workpiece and clinched in accordance with conventional clinching procedures.

Pins used in the riveted joint-making process of the present invention may be of the unheaded cylindrical type, both ends of which are plain, or they may be rivets having one plain end and a preformed head on the opposite end, while the treatment in both cases to which the pin is subjected will be of the same general type. The particular location and shape of zone treated can differ according to the particular requirements of the joint and the results desired. Also, while a typical application of the invention is described for joining two workpieces in face-to-face relationship it will be understood that the joint may incorporate a larger number of workpieces. Also it will be understood that representative types of pin are shown and described to illustrate the principles of the invention.

Figure 1:
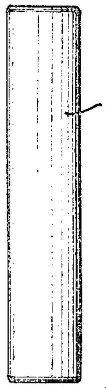
FIGURE 1 is an elevation of a plain pin of the type conventionally used in making a riveted joint.
Figures 4, 5, 6:
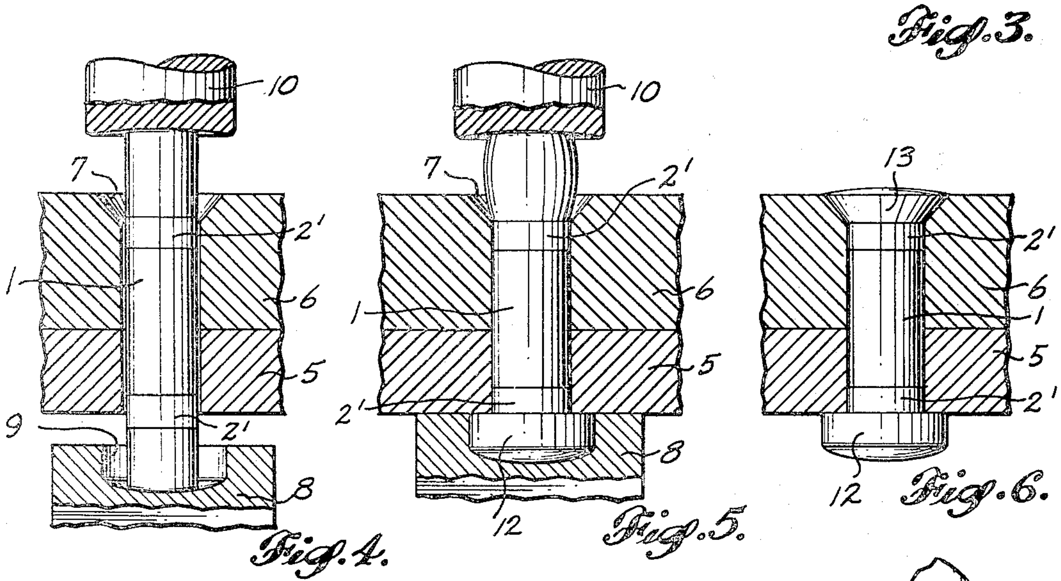
FIGURE 4 is a section through portions of workpieces to be joined by riveting, showing a treated pin in elevation at the beginning of the clinching operation with portions of the clinching tools shown partially in section.
FIGURE 5 is a similar view showing an intermediate stage in the clinching operation and FIGURE 6 is a similar view showing the clinching operation completed.

The plain pin shown in FIGURE 1 is of the type used conventionally in automatic riveting machines. Such pins are, of course, available in different lengths and diameters depending upon the thickness of the joint to be made and the strength characteristics required. The procedure customarily employed for clinching such a pin in a joint is illustrated in FIGURES 4, 5 and 6, except that in those figures a pin embodying the present invention is being clinched instead of the conventional pin. The rivet-receiving hole in the workpieces is cylindrical but should be drilled to close tolerances. It is preferred that the pin have a push fit in the pin-receiving hole, or even a light drive fit, but particularly for the purposes of the present invention the fit should not be a press fit. The pin may even have a loose fit in the pin-receiving hole of the workpieces, but there should not be excessive play between the pin and the hole because it is important that when the pin has been clinched it fit tightly in the hole.

The technique of the present invention is particularly advantageous for riveted joint structures of high efficiency, that is, joints which are light and strong such as are particularly useful in airplanes, for example. Also, the present joining technique is particularly important for joints which are subjected to pronounced variations in load, which tend to produce fatigue in workpieces of the joint which are secured together by the pins or rivets.

As has been indicated above, investigation has shown that the type of riveted joint most resistent to fatigue is one in which the pin or rivet fits tightly in the pin-receiving hole, and the shank of such pin in upset condition stresses the circumference of the pin-receiving hole substantially uniformly throughout the composite thickness of the workpieces. The problem has been to devise a joint in which to obtain such uniformity of stress conditions where the pin-receiving hole and the pin are of uniform diameter. To utilize a pin-receiving hole which is not of uniform diameter, but which is tapered, increases the cost of making the joint.

In driving a pin or a rivet having a shank of uniform cross section in a hole of uniform cross section during the clinching operation, the exterior portion of the shank adjacent to the plain end of the pin or rivet to which the upsetting force is applied and outwardly of the end of the hole in which the rivet is received; tends to swell faster than portions of the shank inwardly of the shank-receiving hole end portion because such exterior shank portion is unconfined. In the development of the present invention it has been discovered that the expansion of the exterior portion of the shank adjacent to the end of the shank-receiving hole can be retarded by increasing the hardness of the shank materials over a short length at the location encircled by the end portion of the shank-receiving hole and extending outward beyond the hole end for a short distance as shown in FIGURE 4. Alternatively, seizing or interference between the end portion of the shank-receiving hole and the zone of the shank which it encircles can be deterred and retarded by reducing the cross section of such zone, so that it must be expanded to a greater extent than other portions of the shank before the pin shank or rivet shank zone is immobilized by frictional engagement with the shank-receiving hole.

Figure 3:
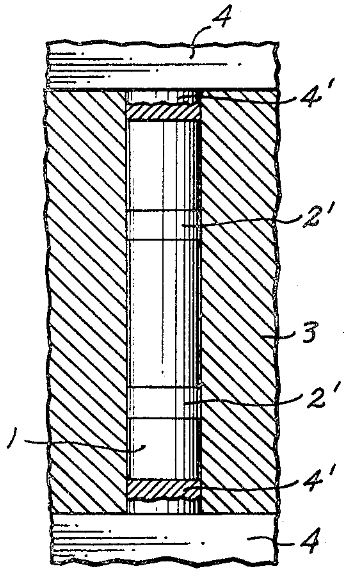
FIGURE 3 is an elevation of the pin pressed axially to expand the groove zones, the mechanism for effecting such expansion being shown in section.

The preferred type of treatment of a pin to be riveted for accomplishing the desired results is shown in FIGURES 3 and 5. The pin 1 shown in FIGURE 1, which is of the type conventionally used in making riveted joints by the use of automatic clinching equipment, can be modified to produce a pin in accordance with the present invention. The external wall of the pin 1 is cylindrical. Such cylindrical shape is first necked at the zone, or zones, in which it is desired to deter expansion or swelling of the pin shank during the clinching operation. Such necking condition can be accomplished by machining or rolling an annular groove 2 in the circumference of the shank zone, or by stretching the shank axially in a localized area and under controlled conditions until the elastic limit of the material is exceeded to the point that an annular groove 2 is produced.

Figure 2:
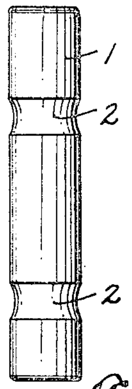
FIGURE 2 is an elevation of such a pin having circumferential grooves formed in spaced zones.

If reliance to deter seizing of the pin shank zone with the end portion of the pin-receiving hole surrounding it is to be placed on hardening of the pin shank surface in such zone, such hardening can be accomplished by placing the pin of FIGURE 2 in a cavity of a die 3 and upsetting the pin lengthwise.

The cavity of die 3 should receive the pin 1 snugly. Presser members 4 located at opposite sides of the die have bosses 4' fitting in opposite ends of the pin-receiving cavity. As the presser members 4 are pressed toward each other the pin will be contracted lengthwise by pressure of the bosses 4' on its opposite ends. Because the necked portions 2 of the pin are of smallest diameter they will be upset to the shape indicated at 2' in FIGURE 3, in which the necked portions have been restored to the same cross-sectional shape as the remainder of the pin. The cold-working of the necked zones resulting from such upsetting operation has a hardening action on such zones so that their surface hardness will exceed the hardness of the remainder of the pin shank surface.

In driving a pin of the type shown in FIGURE 3 such pin 1 is placed in a pin-receiving hole in workpieces 5 and 6, shown assembled in face-to-face contact in FIGURE 4. If it is desired for one end of the riveted pin to be flush with the exterior surface of a workpiece when the joint has been completed, one end 7 of the pin-receiving hole can be countersunk, as shown in FIGURE 4. The pin is held against dropping out of the pin-receiving aperture by a presser tool 8 having in one side a head-forming cavity 9 in which the lower end of the pin rests.

as shown in FIGURE 4. A percussion tool 10 engages the upper end of the pin 1.

In clinching the pin 1 by the use of the automatic riveting machine, the workpieces 5 and 6 and the percussion tool 10 are held in the fixed relationship shown in FIGURE 4 while the presser tool 8 is moved from the position shown in FIGURE 4 to the position of FIGURE 5. By such movement the lower end portion of the pin will be expanded to the degree necessary to make the shank fit tightly in the pin-receiving hole and the plain end of the pin will be upset to form the head 12. When the presser tool has seated against one side of the workpiece stack the percussion member 10 will be actuated to strike the upper plain end of the pin for the purpose of expanding further the pin shank in the pin-receiving hole, and also will cause the upper plain end of the pin to mushroom for the purpose of filling the countersunk cavity 10 in the manner shown in FIGURE 6.

It has been found that during such clinching operation the hardening of the shank zones 2′ effected by the sequential operations of necking the pin zones, as shown in FIGURE 2, and then upsetting the necked zones, as shown in FIGURE 3, deters the lateral expansion or swelling of such zones of the shank during this driving operation. Consequently, the portion of the pin shank between the hardened zones 2′, that is, nearer the center of the pin-receiving hole, will be expanded to press against the walls of the hole during the initial stages of the clinching operation to a greater extent than the expansion of the zones 2′. Because the expansion of such zones is deterred they will be less inclined to seize the encircling portions of the hole and will be moved axially to a greater extent during clinching of the pin so as to enable a greater degree of lateral expansion of the central portion of the pin shank to be effected.

Eventually, of course, the expansion of the zones 2′ will effect seizure between these portions of the pin shank and the encircling portions of the pin-receiving hole, but such seizure will follow, rather than precede, tight engagement of the central portion of the pin shank with the wall of the hole. Because the exterior pin shank is unrestrained immediately outwardly from each end of the pin-receiving hole, such portions of the pin, meeting no resistance to expansion, tend to expand more rapidly than portions of the shank within the hole which engage the wall of the hole. Consequently, in the conventional clinching operation seizure between the laterally expanding or mushrooming pin shank and the wall of the hole almost invariably occurs earliest at one or both ends of the pin-receiving hole in the workpieces.

Instead of providing hardened zones on the pin shank to deter expansion of such zones, seizure between a pin shank zone and the wall of the pin-receiving hole can be deterred simply by clinching a pin having unhardened necked zones of the type shown in FIGURE 2. During the clinching operation, as in the die-upsetting operation discussed above in connection with FIGURE 3, the zones 2 would, of course, expand laterally more rapidly than the portions of the pin shank of greater cross section because of the greater force concentration in these sections, but also it would be necessary for such necked zones to expand to a considerably greater degree than the other portions of the pin shank before seizing could occur between such necked portions and the wall of the pin-receiving hole. By simply providing necked portions, therefore, on a pin to be riveted the same general effect of obtaining a more uniform engagement between the pin shank and the wall of the pin-receiving hole throughout the length of such hole can be accomplished.

Figure 7:
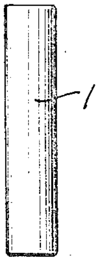
FIGURE 7 is an elevation of a pin of the type conventionally used for a riveted joint.
Figure 8:
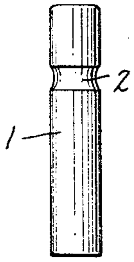
FIGURE 8 is a similar view of a pin having a zone in which a circumferential groove has been formed and FIGURE 9 is a similar view in which the grooved zone has been upset by the application of axial force to the pin.
Figure 9:
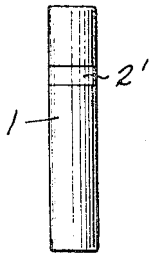

In some instances it may be found that the portion of a machine-driven pin shank binds more tightly adjacent to one end of the pin-receiving hole than adjacent to the other end of such hole. Under such circumstances substantially uniform expansion of the pin shank may be accomplished during clinching if the pin 1 is relieved or necked from the original condition of FIGURE 7 at 2, as shown in FIGURE 8, or is hardened at 2′, as shown in FIGURE 9, only adjacent to one end of the pin-receiving hole. The procedure for clinching such a pin would be similar to that described in connection with the procedure of FIGURES 4, 5 and 6.

Figure 10:
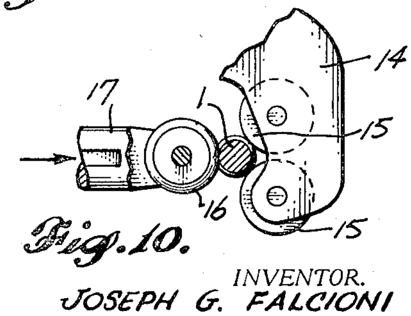
FIGURE 10 is a cross section of a pin and a fragmentary portion of a cold-rolling device operating on the pin.

As has been mentioned above, the pin 1 can be necked either by machining an annular groove in it, by stretching the pin locally beyond its elastic limit, or by rolling an annular groove in it. In the last mentioned case the pin could either be clinched with the rolled groove in it, in which case the zone of the groove would be both relieved and hardened, or the pin could be upset in a manner described in connection with FIGURE 3, in which case the treated zone would be harder than such zone in a machine-grooved pin which was upset. Mechanism for rolling an annular groove in a pin is illustrated in FIGURE 10 as including a body 14, which can be of C-clamp shape, in which two backing rollers 15 are journaled in adjacent relationship to engage one side of the pin. The grooving roller 16 is carried by the reciprocable spindle 17 mounted on the horn of the frame 14 opposite that carrying rollers 15. The roller support can be reciprocated in the direction indicated by the arrow in FIGURE 10 progressively as the pin 1 and frame 14 are rotated relatively to roll the groove progressively in the pin.

Figure 11:
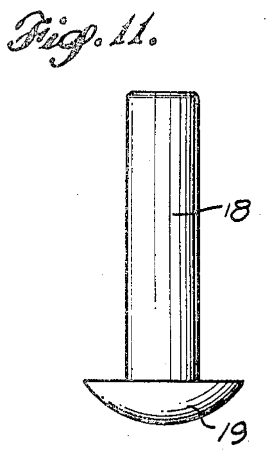
FIGURE 11 is an elevation of a button-head rivet of conventional type.

While the technique of treating a pin to form a zone for deterring seizing has been described above, the same considerations and the same procedure may be applied to a rivet having a preformed head, such as the rivet 18 having the preformed head 19, shown in FIGURE 11. Such a rivet is clinched by backing the head 19 when it is held against one side of a stack of workpieces while the plain end of the rivet is pressed or impacted to expand the rivet shank into tight engagement with the rivet-receiving hole and upset the plain end of the rivet. Under these circumstances the upsetting action tends to occur adjacent to the end of the rivet-receiving hole next to he plain end of the rivet. The object of the present invention can therefore be accomplished if the plain end of the rivet shank is reduced in cross section or hardened, or both.

Figure 12:
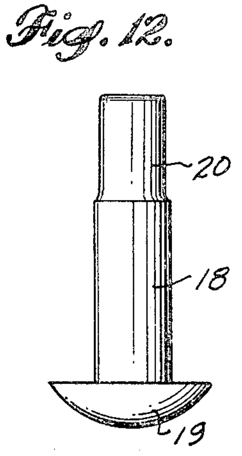
FIGURE 12 is a similar elevation of a similar rivet having its end zone reduced in cross section and FIGURE 13 is a similar view of the rivet in which its reduced zone has been upset, the mechanism for effecting such upsetting being shown principally in section.
Figure 13:
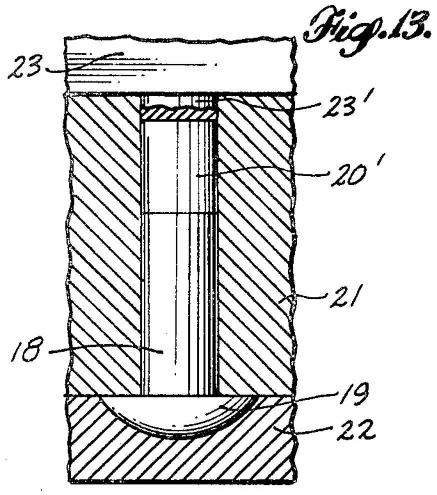

In FIGURES 12 and 13 the same general type of technique is employed to neck and harden the plain end of the rivet shank. First, such plain end is machined, or rolled, to form the necked portion 20 shown in FIGURE 12, and such necked rivet is then placed in a snugly fitting cavity of the die 21 shown in FIGURE 13. The presser member 22 has in it a recess which fits the buttonhead 19 of the rivet while the presser member 23 has a boss 23′ adapted to fit into the end of the die cavity in which the plain end of the rivet is lodged. By holding the presser member 22 in the position shown in FIGURE 13 and moving the presser member 23 toward the die 21, the boss 23′ will press against the plain end of the rivet shank and upset it by cold-working to form the hardened end 20′ shown in FIGURE 13, which is of substantially the same cross-sectional shape and area as the remainder of the rivet shank.

Figure 14:
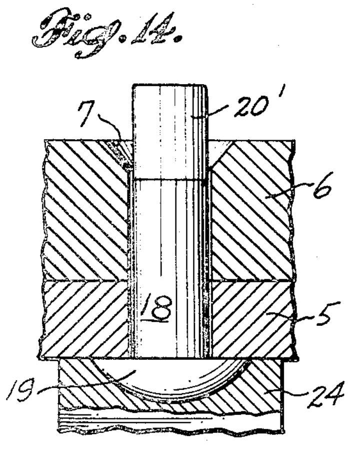
FIGURE 14 is a section through a riveted joint showing a rivet of the type shown in FIGURE 13 in place ready to be riveted.
Figure 15:
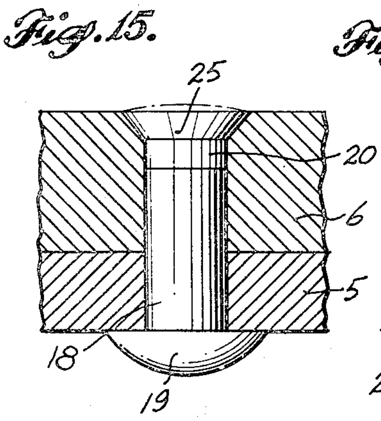
FIGURE 15 is a similar view of the completed joint with the rivet clinched and trimmed.

In FIGURES 14 and 15 the procedure for clinching a rivet of the type shown in FIGURE 13 is illustrated. The buttonhead 19 of the rivet is embraced by the cavity of the anvil 24 which holds the shoulder of the rivet head tightly against the adjacent surface of the workpiece 5. The necked and subsequently upset plain end 20′ of the rivet is then either pressed, or impacted, both to effect upsetting of the rivet shank generally into tight engagement with the shank-receiving hole in the workpieces 5 and 6 and to mushroom the end of the rivet shank to fill the countersunk cavity 7, as shown in FIGURE 15. Because of the hardened character of the rivet end 20′ its lateral expansion will be deterred even in the unsupported exterior portion located outwardly from the end of the rivet shank-receiving hole. Correspondingly, therefore, seizure between the treated plain end portion of the rivet shank and the encircling portion of the workpiece 6 will be deterred relative to the lateral expansion of the portion of the rivet shank between the treated portion 20′ and the rivet head 19.

Because of the delay in seizure of the treated portion 20′ of the rivet shank the expansion of that portion of the rivet shank between such treated portion and the rivet head will be expanded generally uniformly to exert a stress in the shank-receiving hole which is substantially uniform throughout the length of the rivet shank. Because seizure of the treated zone of the rivet shank is deterred such treated zone will be moved a substantial distance toward the rivet head 19 before it is expanded sufficiently to seize the encircling portion of the shank-receiving hole wall in workpiece 6, as shown in FIGURE 15. Consequently the stress in the portion of the rivet shank-receiving hole encircling the treated portion 20′ will be approximately equal to the stress in the remainder of the rivet-receiving hole produced by swelling of the rivet shank. As a result, the riveted joint is able to withstand fatigue stress much more effectively and is much less subject to fatigue failure.

Figure 16:
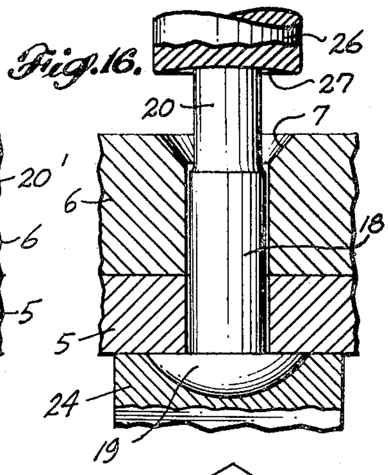
FIGURE 16 is a cross-sectional view through a joint to be riveted in which a rivet of the type shown in FIGURE 12 is in place ready for the riveting operation.

In FIGURE 16 a rivet of the type shown in FIGURE 12 is illustrated as being driven, in this instance the treated portion 20 of the rivet simply being necked. Again, the button rivet head 19 is embraced by the cavity of the anvil 24, which holds the rivet with the shoulder of the head pressed against the outer face of the workpiece 5. The plain end of the rivet is then subjected to impacts by the percussion tool 26. The end of such tool-engaging the end of the rivet shank may have in it a cavity 27 to assist in maintaining contact between the percussion tool and the end of the rivet. As the rivet is struck again the portion of the rivet shank between the treated portion 20 and the head 19 will engage the wall of the rivet shank-receiving hole first. Subsequently the treated portion of the rivet shank will be expanded to press against the portion of the shank-receiving hole encircling it because of the greater amount of expansion required, resulting from the necked condition of such treated portion. Again, however, when clinching of the rivet has been completed it is found that the stress produced by the upset rivet shank in the wall of the rivet hole is substantially equal throughout the length of such hole.

As has been discussed above, the principal improvement in riveted joints utilizing the present invention is manifested in increased resistance to fatigue. The fatigue characteristics of a riveted joint can be determined by subjecting to a standard fatigue test a standard type of test specimen shown in FIGURES 17 and 18. In this specimen the workpieces 28 and 29 are secured together by rivets 18 having on one end heads 19 and on the other end the mushroomed countersunk heads 25. The outer face of this head is shown as having been machined flat to a condition substantially flush with the outer surface of the workpiece 28 from the sligtly bulged condition shown in broken lines in FIGURE 15, which would exist upon completion of the clinching operation. In order to compare accurately the results of such fatigue tests the size and shape of the workpieces 28 and 29 are specified and the size, number and spacing of the rivets 18 along the workpiece are prescribed.

Figures 17, 18:
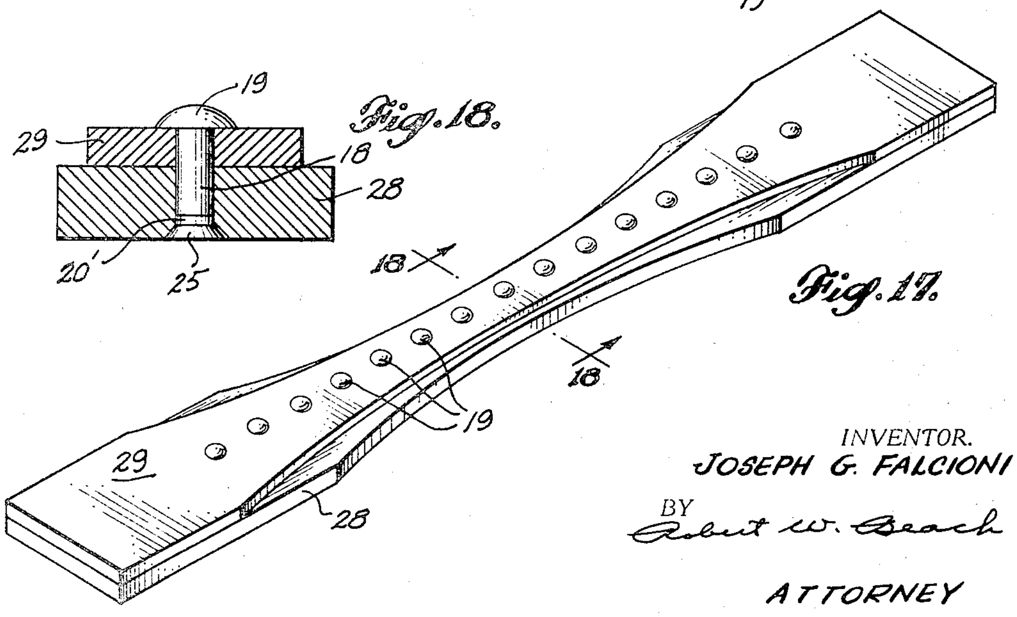
FIGURE 17 is a top perspective of a conventional type of test sample incorporating rivets in accordance with the present invention and FIGURE 18 is a transverse section through such sample.

A standard procedure for subjecting a test specimen such as shown in FIGURES 17 and 18 to a fatigue test, is to place the specimen under tension stress and then successively to approximately double the tension stress and then completely release all tension stress alternately in rapid succession. Thus, for example, if the test specimen shown in FIGURE 17 is 30 inches in length, approximately 4 inches in width, part 29 is approximately 5⁄16 of an inch in thickness and part 28 is approximately ½ inch in thickness, the test specimen can be placed under an initial tension of 24,000 pounds. During the test the tension force will alternately be increased to 48,200 pounds and reduced to 200 pounds compression. Such reversal of force application is effected ten times per second.

Under these conditions of test it has been found that the conventional riveted joint, whether produced by hand or by a riveting machine, will fail after being subjected to 30,000 to 35,000 cycles of stress reversal where the parts and rivets are made of an aluminum alloy. By comparison, a test specimen made of the same material and dimensions, except that rivets and the riveted joint of the present invention are used, has been able to withstand as much as 126,000 stress reversal cycles before failure. In every instance failure occurred in the workpieces 28 and 29 being fractured transversely of their lengths at the location of one of the rivets in the central portion of the test specimen.

I claim as my invention:

1. An elongated solid malleable metal pin of substantialy uniform diameter throughout the greater portion of its length, including at least one end thereof adapted to be riveted in making a joint between workpieces in face-to-face relationship, comprising a pin shank having an annular zone adjacent to said one end of said pin shank adapted to be disposed adjacent to the exposed face of one of the workpieces in such joint, which zone is harder than the portion of said shank lengthwise thereof farther from said one end than said zone, so as to postpone expansion of said hardened zone and deter seizing between said zone and the portion of a workpiece adjacent to the end of a hole in the workpiece in which the pin is inserted until after expansion of the adjacent portion of said shank inwardly from said zone.

2. The pin defined in claim 1, in which the pin shank zone is cold-work hardened to an extent greater than a portion of the pin shank adjacent to such zone.

3. The pin defined in claim 2, in which the pin shank zone is cold-roll hardened to an extent greater than a portion of the pin shank adjacent to such zone.

4. The pin defined in claim 2, in which the pin shank zone is upset to a degree greater than a portion of the pin shank adjacent to such zone.

5. The pin defined in claim 4, in which the pin shank zone has been necked and subsequently upset to a cross-sectional area at least substantially as great as the cross-sectional area of a portion of the pin shank adjacent to such zone.

6. The pin defined in claim 5, in which the pin shank zone has been stretch-necked and subsequently upset.

7. The pin defined in claim 4, in which the pin shank zone has been machine-grooved and subsequently upset.

8. The pin defined in claim 5, in which the pin shank zone has been cold-roll necked and subsequently upset.

9. The pin defined in claim 1, in which the pin is adapted to fit a rivet-receiving hole in workpieces at least a portion of the length of which is of substantially uniform cross section, and the pin shank has two annular hardened zones spaced apart lengthwise of such shank a distance substantially equal to the length of the substantially uniform cross-sectional portion of the rivet-receiving hole, each of which zones is harder than the portion of the pin shank between said zones.

10. The method of making a malleable metal pin for riveting, which comprises forming a generally cylindrical pin the shank of which has an annular necked zone adjacent to an end to be impacted, said end having a diameter substantially equal to that of said shank, and upsetting the pin shank and thereby expanding said necked zone to a cross-sectional area and shape substantially the same as that of the remainder of the pin shank and work-hardening said zone by such expansion, whereby said work-hardened zone will deter seizure thereof when the rivet is set in a workpiece.

11. The method of making a pin defined in claim 10, including machining an annular groove in the pin and thereby forming the necked zone.

12. The method of making a pin defined in claim 10, including stretching the pin and thereby forming the necked zone.

13. The method of rivet-joining workpieces which comprises providing a substantially cylindrical pin-receiving hole through the workpieces, hardening an annular zone of the shank of a pin adjacent to an end to be impacted to make said zone harder than a portion of the pin shank farther from said end, said end and said zone having a diameter substantially equal to that of said shank and said pin being of a size to fit snugly in the pin-receiving hole through the workpieces, fitting the pin through such pin-receiving hole in the workpieces and locating said hardened zone of the pin shank adjacent to a face of a workpiece to deter seizing between said zone and the portion of the workpiece hole encircling said zone, and exerting axial force on the pin in unheated condition and thereby expanding the central portion of the pin within such workpiece hole and clinching the plain end of the pin adjacent to said hardened zone.

14. The method of rivet-joining workpieces defined in claim 13, including forming an annular necked zone in the pin shank and upsetting said annular necked zone and thereby work-hardening said annular necked zone to form the hardened annular zone.

15. The combination of a plurality of metal workpieces in face-to-face relationship having a hole therethrough, and an elongated solid malleable metal pin fitted in such hole of said workpieces and of substantially uniform diameter throughout the greater portion of its length, including at least one end portion thereof protruding beyond an outer surface of a workpiece and adapted to be riveted in making a joint between said workpieces, the shank of said pin having an annular zone adjacent to said one end, at least a portion of which zone is encircled by an end of such hole in said workpieces, and which zone is hardened to postpone expansion of said zone and seizing thereof in the hole until after expansion of the shank portion inwardly from said zone when longitudinal pressure is exerted on said one end portion.

16. The combination defined in claim 15, in which the pin shank zone is cold-work hardened.

17. The combination defined in claim 15, in which the pin shank zone is cold-roll hardened.

18. The combination defined in claim 15, in which the pin shank zone is hardened by being upset.

19. The combination defined in claim 17, in which the pin shank zone has been necked and subsequently upset.

20. A riveted joint comprising a plurality of generally flat workpieces in face-to-face relationship having a hole extending transversely therethrough, and a rivet having a shank extending through such hole, a portion of said rivet shank adjacent to an end of such hole being of material harder than a portion of said rivet shank located farther inwardly from such end of the hole, the central portion of said shank being expanded and pressing against the wall of the central portion of such hole with a pressure at least substantially as great as the pressure of said harder portion of said rivet shank against the portion of the hole wall which it engages.

References Cited

UNITED STATES PATENTS

| | | | |
|---|---|---|---|
| 1,067,362 | 7/1913 | Miller | 85—37 |
| 1,554,336 | 9/1925 | De La Potterie | 85—37 |
| 1,767,653 | 6/1930 | Davis. | |
| 1,934,780 | 11/1933 | Van Halteren | 85—37 |
| 2,102,214 | 11/1934 | Parker. | |

FOREIGN PATENTS

| | | |
|---|---|---|
| 679,962 | 8/1939 | Germany. |

CARL W. TOMLIN, *Primary Examiner.*

R. S. BRITTS, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,405,594 October 15, 1968

Joseph G. Falcioni

It is certified that error appears in the above identified patent and that said Letters Patent are hereby corrected as shown below:

Column 10, line 9, claim reference numeral "17" should read -- 16 --.

Signed and sealed this 3rd day of March 1970.

(SEAL)
Attest:

Edward M. Fletcher, Jr.
Attesting Officer

WILLIAM E. SCHUYLER, JR.
Commissioner of Patents